C. A. JOHNSON.
TOOL POST.
APPLICATION FILED AUG. 1, 1904.
949,078.
Patented Feb. 15, 1910.
3 SHEETS—SHEET 1.
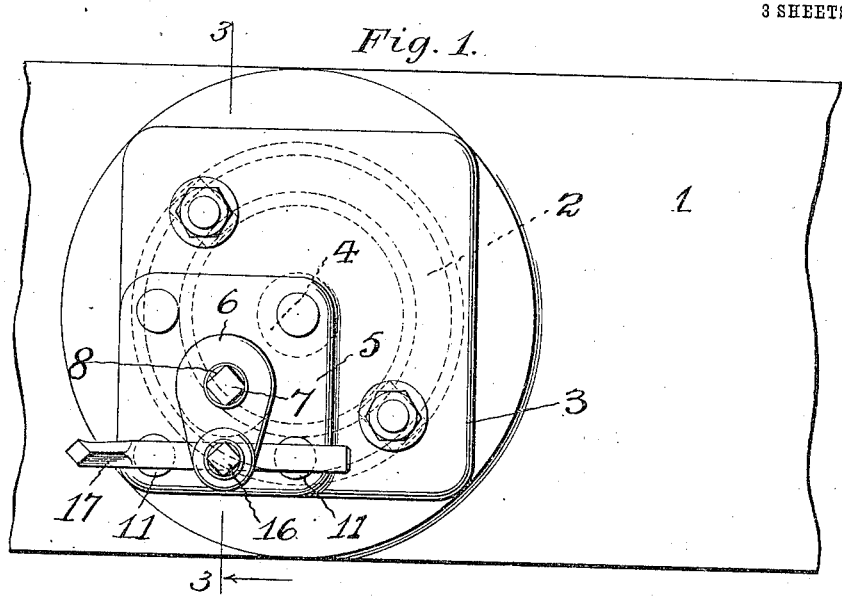
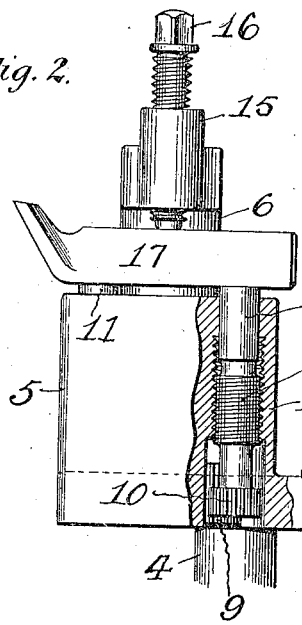
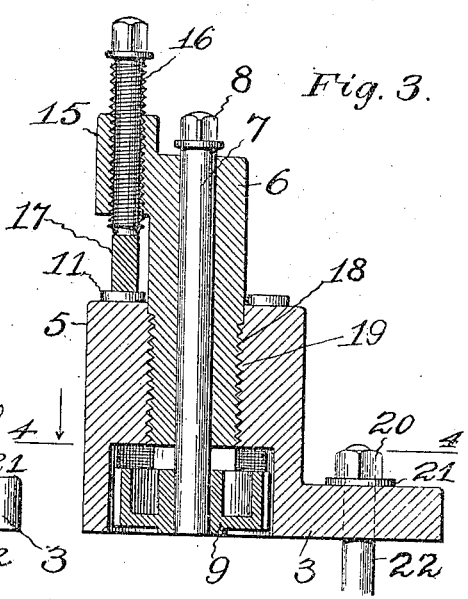
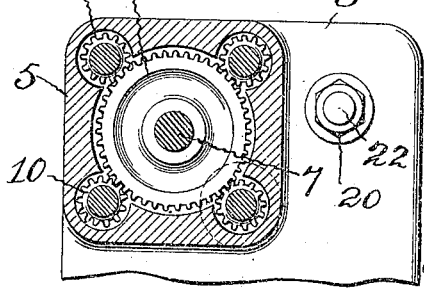
Witnesses:
Inventor:
Charles A. Johnson
By Jenkins & Barker
Attorneys

C. A. JOHNSON.
TOOL POST.
APPLICATION FILED AUG. 1, 1904.

949,078.

Patented Feb. 15, 1910.

3 SHEETS—SHEET 2.

Witnesses

Inventor
Charles A. Johnson
By
Jenkins & Barker
Attorneys

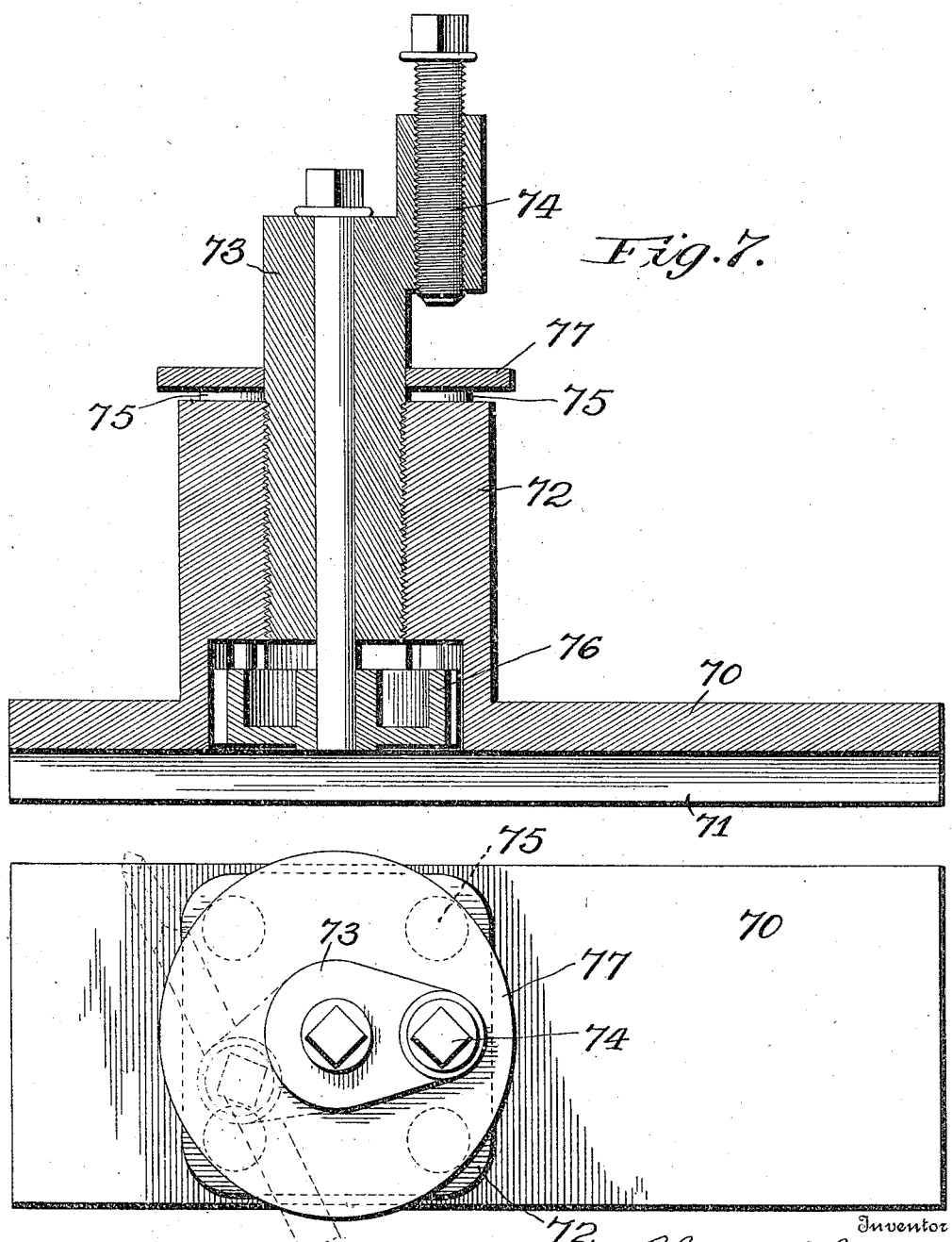

UNITED STATES PATENT OFFICE.

CHARLES A. JOHNSON, OF UNIONVILLE, CONNECTICUT.

TOOL-POST.

949,078.  Specification of Letters Patent.  Patented Feb. 15, 1910.

Application filed August 1, 1904. Serial No. 219,032.

*To all whom it may concern:*

Be it known that I, CHARLES A. JOHNSON, a citizen of the United States, and a resident of Unionville, in the county of Hartford and State of Connecticut, have invented certain new and useful Improvements in Tool-Posts, of which the following is a specification.

The invention relates to tool posts or devices for holding a tool in proper position with suitable universal adjustments for operating upon a piece of work carried in a machine of suitable construction.

It relates more specifically to a universally adjustable tool post and one in which the tool may be swung to any desired angle or may be raised or lowered at will and immediately locked in any desired position of adjustment.

The objects of the invention are to provide a universally adjustable mechanism for holding a tool and one which may be swung into operative position without its component parts interfering with the work operated upon.

A further object is to provide a ready means for raising and lowering a tool and readily locking it in any desired position.

A still further object is to provide a plurality of adjustable rests for a tool and a means for locking the tool with reference to said rests in any desired position of adjustment.

Figure 5:
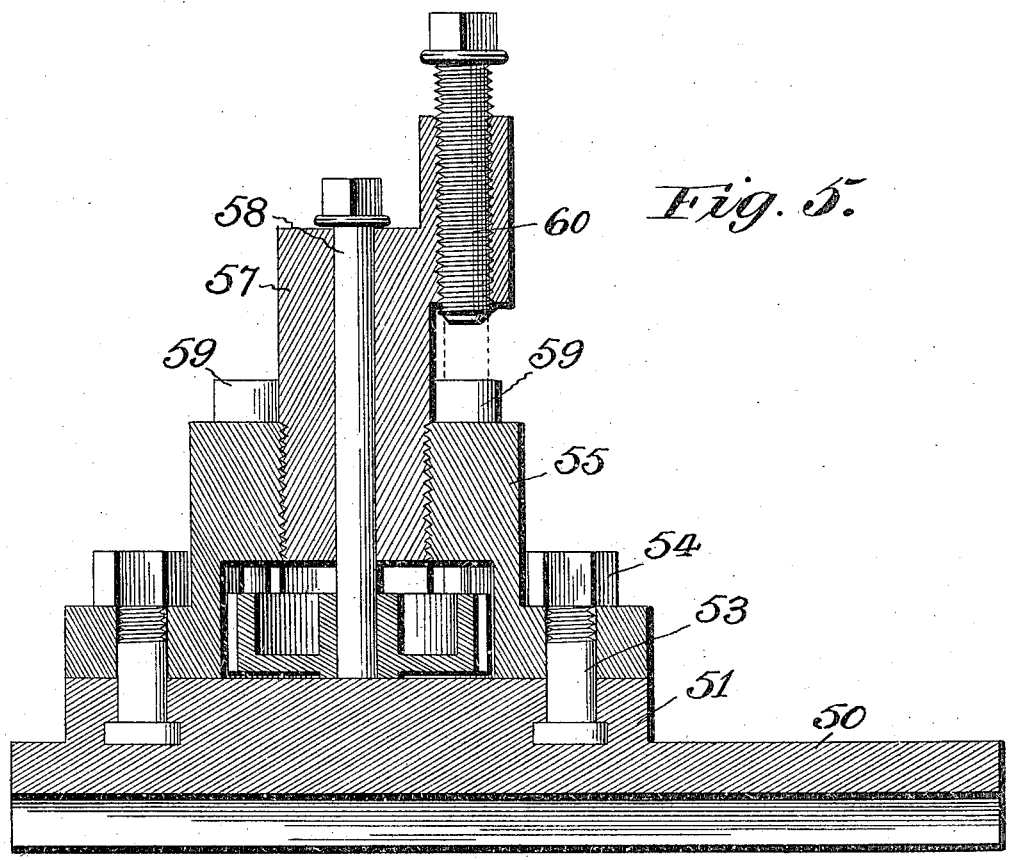
Figure 6:
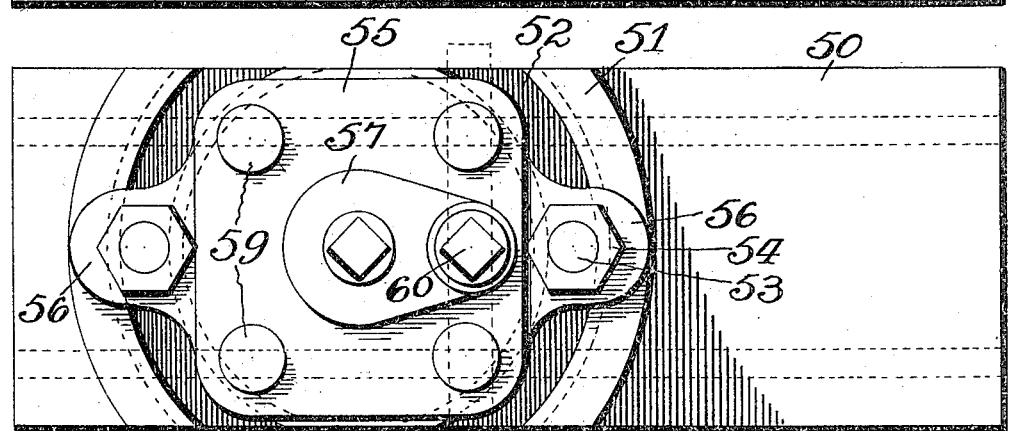

In the accompanying drawings—Figure 1 illustrate a plan view of the improved tool post applied to a tool rest. Fig. 2 is a side view in elevation of the parts shown in Fig. 1 with certain of the parts broken away in section to show construction. Fig. 3 is a detail sectional view on the line 3—3 of Fig. 1. Fig. 4 is a detail cross sectional view on the line 4—4 of Fig. 3. Fig. 5 is a detail central, vertical section of a modified form of the improved mechanism, concentrically arranged with reference to a tool slide or base. Fig. 6 is a plan view of another modification of the parts shown in Fig. 5. Fig. 7 is a vertical, sectional view showing all the several parts formed integral with the tool post concentric with the base. Fig. 8 is a plan view of the parts shown in Fig. 7.

In the ordinary tool holder for lathes and like machines it has been common practice to provide two slides or slide-ways moving transversely to each other, with the means for holding the tool mounted upon the uppermost slide. Such a device in a way gives a universal adjustment for the tool, but obviously, when the base piece or slide of the upper section of such a compound slide is moved into certain position necessary to bring the tool to the required point of adjustment, a portion of the slide will project and oftentimes lie in the path of movement of the work to be operated upon.

It is one of the primary objects of this invention to provide a tool holder or post which may be universally adjustable with reference to the work and yet will not come into interference with said work no matter what its particular position may be. To effect the desired result and prevent interference the preferred construction as to the tool post proper should be so formed that it is practically eccentric to its main center of revolution and thus there are no projecting parts to interfere with the work operated upon. Of course, it is understood that the tool post proper might be concentrically arranged without departing from the spirit or intent of the invention and would be quite as effective in operation. Such a construction is shown in Figs. 5 to 8 inclusive.

As shown in Figs. 1 to 4, the tool post is illustrated in connection with a tool post slide of an ordinary lathe or similar metal-working machine.

In the accompanying drawings the numeral 1 denotes the tool post cross slide or adjustable member, which of course is understood to be mounted in suitable slide-ways to give the necessary rectilinear adjustment. Upon this slide which has an ordinary construction and undercut groove 2, is mounted a rectangular tool post base 3. This base is provided at or near its center with a stud 4 which projects into and engages a suitable opening in the cross slide 1, and through its connection therewith provides a revoluble connection for the tool post.

Rising from the rectangular base piece 3 is the main tool post section 5 which is also preferably of rectangular form and mounted substantially in the corner of the base section 3 in such position that its center is eccentric to the center of the base 3. The rectangular section 5 has at or near its center a standard 6 through which passes a shaft or stud 7 provided at its upper end with an adjusting nut 8 and at its lower end with a spur gear 9.

Equally spaced about the gear 9 and the rectangular section 5 are pinions 10 which intermesh with the gear 9 and form a connection between the spindle 7 and a plurality of movable or adjustable tool rest studs 11.

Each of the tool rest studs with tops 11 are formed with a stud or base section 12, a screw threaded section 13 interengaging with a screw thread 14 formed in suitable bores in the base piece 5, and the pinions 10 which mesh with the gear 9. The gear 9 has a face of considerable width and of such width that the vertical movement of the base sections or studs 12 and pinions 10 will not cause disengagement of the pinions 10 and the gear teeth of the gear 9.

The standard 6 has an offset portion 15 through which passes a binding or locking screw 16, the position of the offset portion 15 being such that as it is swung about the base part 5 it can be brought into position so that the screw 16 may be brought to bear upon a tool 17 and securely lock or bind said tool between the screw 16 and the adjustable tool rest studs 11.

The part 6 together with the offset portion 15 is centrally arranged with reference to the base piece 5 and is provided with screw threads as at 18 to engage an interior screw threaded recess 19 formed substantially as the center of the tool post base 5. It will thus be seen that the part 6 together with the clamping device comprising the offset portion 15 and the screw 16 may be swung radially about the base section 5 so that a tool may be clamped upon either of the adjustable studs 4. It is also to be noted that a rotation of the nut 8 and spindle 7 will cause through the intermeshing of the gears 9 and pinions 10 a movement of the studs 12. This movement will of course be induced by the screw threads 13 and will cause a synchronous rise and fall of the several studs 12.

By the construction herein described the central section 6 may be raised to any desired point. By a movement of the spindle 7 the studs 12 may be raised or lowered to give the proper elevation to the tool and when this is secured the locking down of the screw threaded stud 16 will securely hold the tool in its proper position.

The arrangement of parts herein above described has particular advantages, in that it provides a three point grip for supporting and holding the tool. Ordinarily tools are not made with perfect surfacing and precision as to the shank portion which is held in a tool post. In the arrangement described two points serve as a rest for the shank, while a third point intermediate the rest points, gives a cramping hold on the tool which absolutely binds it and precludes chatter, which is so frequent in ordinary devices, particularly those having a broad substantially flat rest against which the shank is pressed and clamped. A further advantage results from the simultaneous adjustment of the tool rest studs, which are speeded up through the gearing in such manner, that they are given a quick rise or fall as the adjusting spindle 7 is rotated. It will also be noted that the tool rest studs providing the very advantageous three point grip and clamp may be raised or lowered for adjusting the height of the tool with even greater rapidity and facility than is secured in the ordinary tool post mechanisms in common use, having a long flat rest surface.

The cross slide 1 is of course of ordinary construction and is provided with a T-shaped groove or slot 2 within which are arranged T-headed bolts that project upward through the base 3 and thus provide a means of locking said base 3 together with its appurtenant parts in any desired position of adjustment.

Nuts 20 coöperating with washers 21 and T-headed bolts 22 provide a convenient locking means for securing the tool post to the cross slide 1 in various positions of adjustment.

It should be particularly noted that the tool post proper, pivoted on the stud 4 including the locking means for securing the tool 17 is really eccentrically mounted with reference to the base 3. This being so, the tool 17 may be brought up against the face plate of a lathe and the work carried therein without the interference of its supporting parts, and it may also be swung into almost any desired position without the base interfering with the work rotated in the metal working machine. In fact, a metal working machine may be used carrying a piece of work equal to the entire radial swing of the machine, and a tool may be brought to bear upon said work in any desired position without any of the supporting parts of said tool being brought into position to interfere with the work.

Obviously, the details of the several parts might be varied without departing from the spirit or intent of the invention, and such ordinary changes within the skill of the mechanic are contemplated herein.

There are also illustrated in Figs. 5 to 8 inclusive slightly modified arrangements of the mechanism.

In Figs. 5 and 6 substantially the same parts are shown as heretofore described, although the tool rest slide 50 is of the narrow type commonly used and is provided with a boss 51 having formed in it a locking groove 52 which is engaged by studs 53, and through the medium of nuts 54 forms a ready means for locking the base 55 of the tool post in any desired position of adjustment. Ears 56 project from the base 55 and are engaged by the nuts 54. It is to be noted that the base 55 is concentrically mounted with reference to the locking groove 52 and slide 50. The adjustable stud 57, the adjusting shaft 58, tool rest studs 59 and clamping bolt 60, together with the gears and operating parts are substantially the same as heretofore described, and, in fact, the device shown in Figs. 5 and 6 have substantially the same parts performing the same functions, but concentrically arranged with reference to the base rather than eccentrically arranged as indicated in Figs. 1 to 4. This construction on small slides may be used with quite as much facility as the eccentric arrangement heretofore indicated.

In Figs. 7 and 8 there is shown an arrangement of the improved tool post in which the post and slide are formed integral. The tool slide 70 is provided with the ordinary slide-way 71 and has extending upwardly from it a boss or base 72. This boss is concentrically arranged with reference to the slide 70 and has at its center an adjustable clamping stud 73 with a clamping bolt 74. As in the cases heretofore described, the adjustable tool rest studs 75 are arranged within the boss or base 72 and are provided with threads and pinions engaging the adjusting gear 76. All of these parts are the same as heretofore described. Arranged upon the tool rest studs 75 is a plate 77 which forms a base or rest for the tool and it is of course obvious that as the tool rest studs 75 are raised or lowered the base 77 will rise and fall. With this arrangement the tool may be laid upon the base 77, raised to any desired position by rotating the gear 76, and thereupon the clamp 74 may be swung in to position to lock the tool as desired.

It is apparent that any number of tool rest studs might be used and arranged in any desired manner, and of course, the number of clamping members coöperating therewith may be varied to suit the exigencies of any desired case.

What I claim as my invention and desire to secure by Letters Patent is:—

1. In combination in a tool post, a base piece, a plurality of tool rest studs mounted for vertical movement in the base piece and arranged about a common center, said tool rest studs having intermeshing connections for simultaneous adjustment of the studs and forming a rest for a tool, means connected with the intermeshing connections of the tool rest studs for simultaneously raising and lowering said studs, and means for locking a tool upon the tool rest studs.

2. In combination in a tool post, a pivoted base or support, means for locking the base-piece to its support, a plurality of tool rest studs mounted for vertical movement in the base-piece and arranged about a common center, the axis of one of said tool rest studs being coincident with the axis of the pivot of the base-piece, said tool rest studs having intermeshing connections for simultaneous adjustment of the studs and forming a rest for a tool, means connected with the intermeshing connections of the tool rest studs for simultaneously raising or lowering said studs, and means for locking a tool upon the tool rest studs.

3. In combination in a tool post, a base or support, a central pivot for said base or support, means for locking the base-piece to its support, a plurality of tool rest studs mounted for vertical movement in the base-piece and arranged about a common center eccentric to the central pivot of the base or support, one of said tool rest studs having its axis coincident with the axis of the pivot of the base, said tool rest studs having intermeshing connections for simultaneous adjustment of the studs and forming a rest for a tool, means connected with the intermeshing connections of the tool rest studs for simultaneously raising and lowering said studs, and means for locking a tool upon the tool rest studs.

4. In combination in a tool post, a base piece or support having a central pivot, a locking standard eccentrically arranged with reference to said central pivot of the base piece, a plurality of vertically adjustable tool rest studs arranged about said eccentric locking standard, one of said studs having its axis coincident with the axis of the central pivot of the base-piece, said tool rest studs having intermeshing connections for simultaneous adjustment of the studs and forming a rest for a tool, means connected with the intermeshing connections of the tool rest studs for simultaneously moving said studs and means appurtenant to the locking standard for locking a tool upon the tool rest studs.

5. In combination in a tool post, a pivoted base or support, a locking standard having its center eccentrically arranged with reference to the pivot of said support, a plurality of vertically adjustable tool rest studs concentrically arranged about the locking standard, and an adjusting spindle concentrically arranged with reference to the locking standard, intermeshing gears intermediate said adjusting spindle and the adjustable studs and means carried by the locking standard for locking a tool upon the adjustable studs.

6. In combination in a tool post, a concentrically pivoted base or support and means for locking said base in various positions of adjustment about its pivot, a locking standard, rest studs having intermeshing connections for simultaneous adjustment and forming a rest for a tool, said studs concentrically arranged about the locking standard, an adjusting spindle concentrically arranged with reference to said studs and the locking spindle and connected with said studs for simultaneously adjusting them and a locking member appurtenant to the locking standard adapted to lock the tool upon two of the adjustable tool rest studs.

7. In combination in a tool post, a centrally pivoted base or support, a tool post section rising from said base, a locking standard centrally arranged with reference to said tool post section, a plurality of tool rest studs arranged about said locking standard, each threaded to the support, an adjusting spindle concentrically arranged with reference to the locking standard and bearing a gear, pinions arranged upon each of the adjustable tool rest studs and meshing with the gear of the adjusting spindle, and means for locking a tool between said adjustable tool rest studs and the locking standard.

8. A tool post comprising a base or support, a plurality of tool rest studs simultaneously adjustable with reference to said base, gearing interconnecting said studs, and a swinging clamping device for clamping a tool upon two of said tool supporting studs.

9. A tool post comprising a base piece, a rest for the tool consisting of a plurality of independent tool rest studs, intermeshing connections for simultaneously adjusting said studs, and a rotatably adjustable locking device arranged centrally of the studs for locking the tool upon two of said supporting studs.

10. A tool post comprising a base or support, a vertically adjustable tool base mounted upon a plurality of geared tool rest studs and forming a base upon which a tool may be adjusted at different angles in various parallel horizontal planes, and a swinging clamping device centrally arranged with reference to the tool rest studs and tool base for securing the tool upon the adjustable base in various positions.

11. A tool post comprising a base or support, a tool rest consisting of a plurality of vertically adjustable tool rest studs, a clamping device centrally arranged with reference to said studs and adapted to be swung about its center, a central bar passing through said clamping device, a gear secured to said bar and pinions mounted upon the lower ends of the tool rest studs and meshing with said gear, the movement of the clamping device and gears being independent one of the other.

12. A tool post comprising a base or support, a tool rest consisting of vertically adjustable tool rest studs, a clamping device centrally arranged with reference to said studs and adapted to be swung about its center, a bar concentric with said clamping device, and gear connections intermediate the bar and tool rest studs for moving the latter, the movement of the clamping device and gear connections being independent one of the other.

CHARLES A. JOHNSON.

Witnesses:
Wm. H. Barker,
Lena S. Berkovitch.